Oct. 23, 1951     C. G. A. ROSEN ET AL     2,572,392
ENGINE COOLING, CYLINDER JACKET AND HEAD CONSTRUCTION
Filed April 23, 1947     3 Sheets-Sheet 2
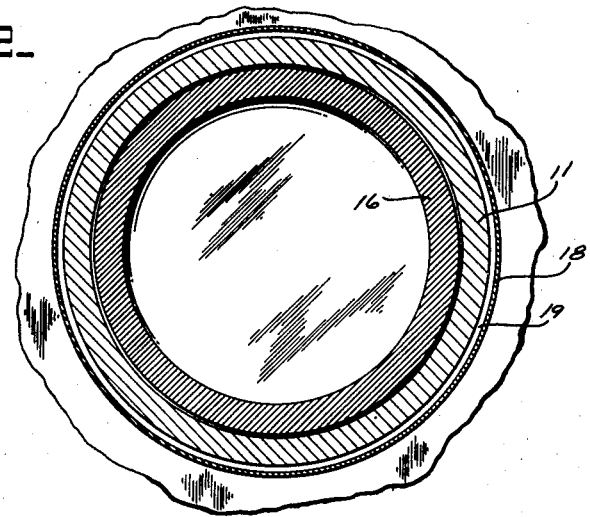
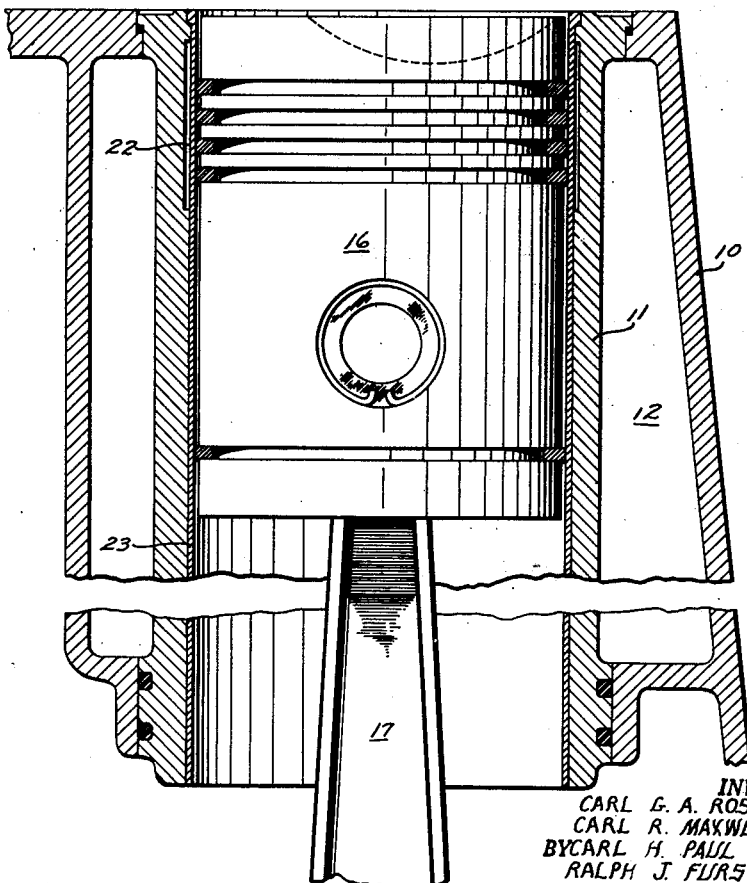
INVENTORS.
CARL G. A. ROSEN
CARL R. MAXWELL
CARL H. PAUL
RALPH J. FURSTOSS
BY
ATTORNEY.

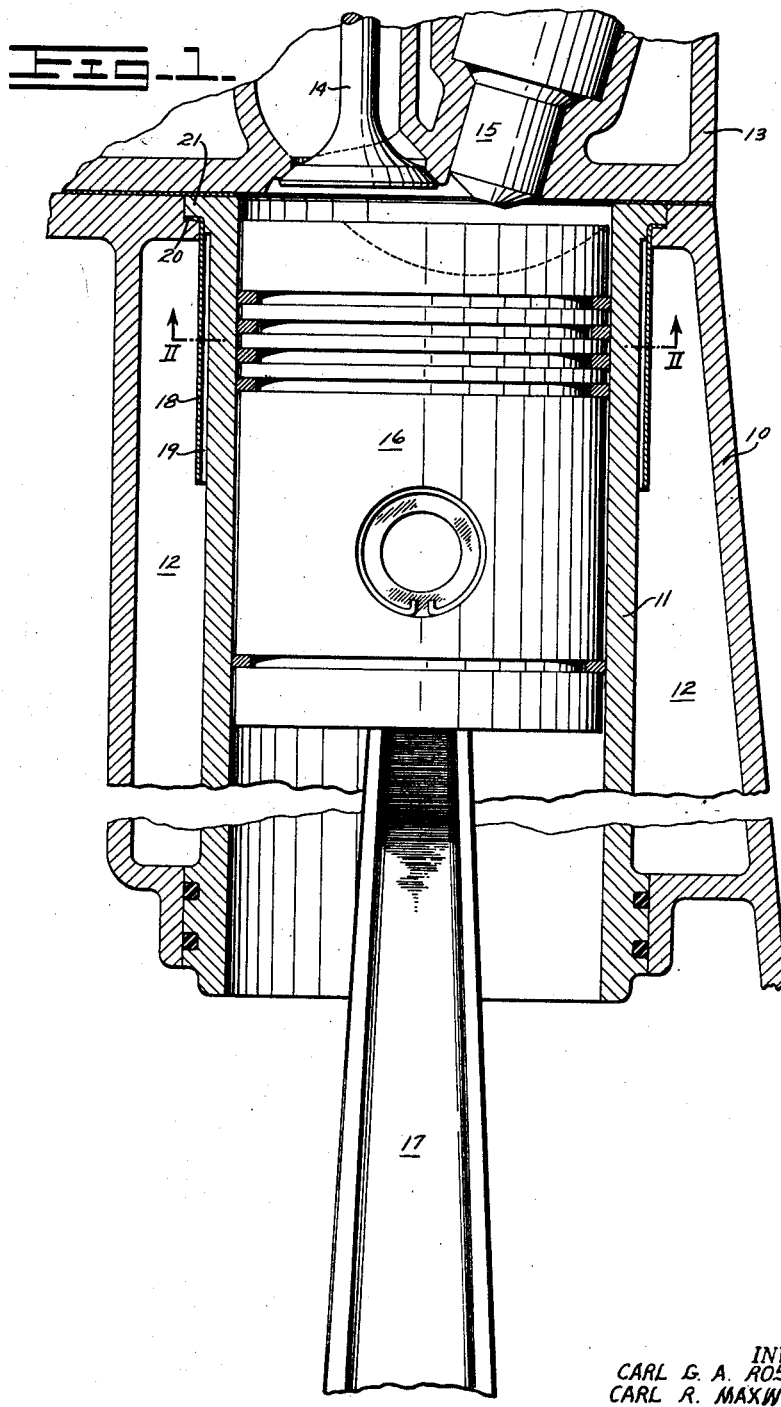

Oct. 23, 1951  C. G. A. ROSEN ET AL  2,572,392
ENGINE COOLING, CYLINDER JACKET AND HEAD CONSTRUCTION
Filed April 23, 1947  3 Sheets-Sheet 3

INVENTORS.
CARL G. A. ROSEN
CARL R. MAXWELL
BY CARL H. PAUL
RALPH J. FURSTOSS

Charles M. Fryer
ATTORNEY.

Patented Oct. 23, 1951

2,572,392

UNITED STATES PATENT OFFICE 2,572,392

ENGINE COOLING, CYLINDER JACKET, AND HEAD CONSTRUCTION

Carl G. A. Rosen, Peoria, Carl R. Maxwell, Washington, Carl H. Paul, Peoria Heights, and Ralph J. Furstoss, Peoria, Ill., assignors to Caterpillar Tractor Co., San Leandro, Calif., a corporation of California Application April 23, 1947, Serial No. 743,336

12 Claims. (Cl. 123—41.79)

This invention relates to a method and apparatus for operating internal combustion engines in a manner to reduce wear and deterioration, particularly of certain areas in the cylinder liners of the engine.

The upper inner surface of an engine cylinder liner and especially that part traversed by the uppermost piston ring is subjected to heavy wear and also to corrosive conditions caused by the deposit of corrosive substances resulting from fuel combustion under certain conditions and particularly when some types of fuels and lubricants are used, for example fuel oil of high sulphur content employed for compression ignition engines, the wear taking place in this area is too rapid to meet the normal requirements of engine endurance.

In analyzing the causes of this excessive wear we have discovered that certain corrosive acids such as nitric, sulphuric, and carbonic acids, as well as formic and other organic acids are formed during combustion and deposited on the cylinder liner in this critical area. Most of these acids, or at least the non-organic ones enumerated, are formed only in the presence of liquid water. The water essential to their formation occurs within the combustion chamber of the engine as condensate or dew depositing on the cylinder liner because of the effect of coolant upon the liner. We have discovered that the formation of dew can be reduced or eliminated by operating the engine at a higher temperature to maintain the cylinder liner above the dew point and thus to prevent the formation and deposit thereon of corrosive acids.

To raise the temperature of an engine beyond the level at which it is designed to operate has many undesirable results. Accordingly an object of the present invention is to provide a method and apparatus for operating an internal combustion engine whereby the upper or critical portion of the cylinder liner will be maintained above dew point and will be above the temperature of the rest of the liner in order to prevent the formation and deposit of corrosive substances on the liner and thereby to increase its useful life. Further and more specific objects and advantages of the invention are made apparent in the following specification by reference to the accompanying drawings illustrating the invention in some of its preferred forms.

In the drawings:

Fig. 1 is a fragmentary vertical sectional view through a portion of an engine block and cylinder showing a cylinder liner constructed in accordance with this invention;

Fig. 2 is a horizontal sectional view taken on the line II—II of Fig. 1;

Fig. 3 is a section similar to Fig. 1 illustrating a modified form of the invention.

Figure 4:
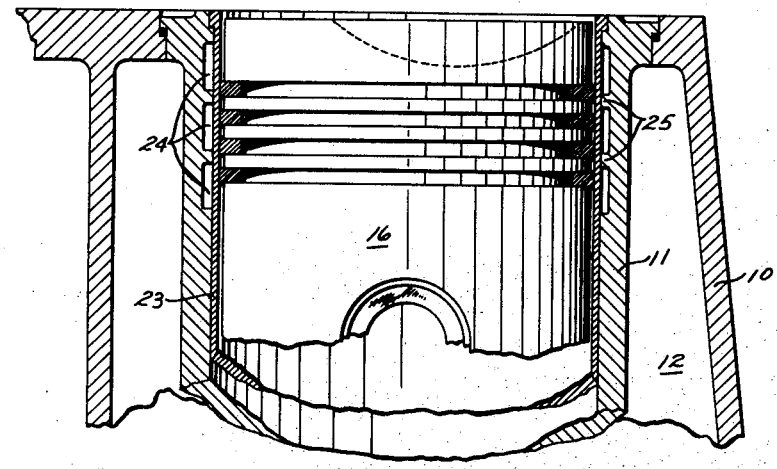
Figs. 4 and 5 are fragmentary sections illustrating further modifications of the invention.

In Fig. 1 a portion of an engine cylinder block is illustrated at 10 as containing a cylinder liner 11 spaced from the block to provide a jacket or water chamber 12 for the reception of coolant, such as water, which is circulated through the jacket during operation of the engine in a conventional manner. A cylinder head, a portion of which is shown at 13, encloses the top of the cylinder formed by the liner 11 and usually includes the conventional valves, one of which is shown at 14 and a fuel nozzle 15. A piston 16 is disposed for reciprocation in the cylinder and connected by the conventional rod 17 with a crankshaft (not shown). It is the upper inside surface of the cylinder liner 11 and usually that portion of the liner extending about two inches down from its top that is subjected to excessive wear because of the deposit thereon of acid-containing substances formed during combustion of fuel in the combustion chamber or upper end of the cylinder.

The water contained in the jacket 12 serves the purpose of maintaining the cylinder liner and other parts of the engine cool and in doing so usually maintains the upper part of the cylinder liner at a temperature sufficiently low to cause the formation of condensed moisture or dew. It is the moisture or dew forming on the upper area of the cylinder liner wall which results in the formation and deposit of corrosive acids thereon.

The present invention permits the operation of an engine at normal temperatures resulting from the circulation of coolant through the jacket 12 but so insulates the upper portion of the cylinder liner from the cooling effect of the water in the jacket 12 that the temperature in this area is maintained above the dew point. This is accomplished as illustrated in Figs. 1 and 2 by a shroud or skirt 18 spaced outwardly from the cylinder liner to provide a narrow annular area 19. The lower end of the skirt 18 is open to communication with the water jacket 12 so that water contained by the jacket is free to pass into the space 19. Because of the narrowness of this space, however, the water contained therein will not tend to circulate with the cooling water in the jacket 12 and will remain relatively stationary beneath the skirt to form a blanket or insulator inhibiting the transfer of heat from the cylinder liner to the coolant and thus causing the upper portion of the cylinder liner to remain at a higher temperature than the lower portion and other cooled parts of the engine.

One method of securing the skirt 18 in place is illustrated in Fig. 1 where a flange 20 is formed at its upper edge and secured beneath an outwardly flanged portion 21 of the cylinder liner itself. The space 19 between the skirt 18 and the cylinder liner need not be filled with water but may be filled with air or other substances having relatively poor heat conducting properties. In fact with the construction shown in Fig. 1, it is possible that the small space 19 there illustrated will become filled with rust or deposits of other material suspended in the cooling water to the exclusion of water from the space. However, so long as such materials do not have good properties of heat conduction, they will serve the purpose of retarding heat transfer and maintaining the desired area of the cylinder liner at a temperature sufficiently high to prevent the formation of corrosive acids and the like.

A construction illustrating the use of a dead air space to inhibit heat transfer is illustrated in Fig. 3 of the drawings. In this figure the cylinder liner 11 is shown as bored or relieved on its inner surface to provide the space 22 and a tubular metal insert 23 is pressed into the main liner to serve as an inner lining and to completely enclose the space 22. With this arrangement it is possible that pressures within the cylinder will cause outward bulging of the relatively thin tubular insert 23. This may be avoided by the construction illustrated in Fig. 4 where in place of the single recess or bore 22 in the main cylinder 11 a plurality of recesses 24 have been formed leaving inwardly projecting ribs or ridges 25 to support the tubular insert 23 in a manner to prevent it from bulging outwardly into the air space which retards the transmission of heat.

Figure 5:
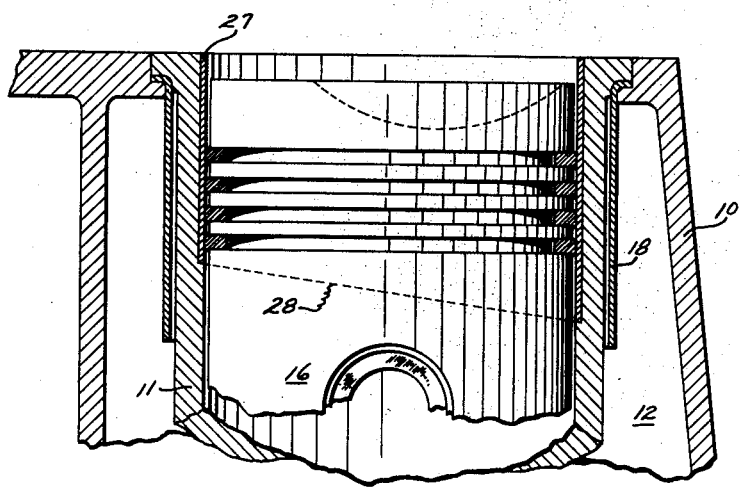

A still further modification of the invention is shown in Fig. 5 of the drawings where, in addition to the shroud or skirt 18 of Fig. 1, the upper end of the cylinder liner 11 is bored for the reception of an insert 27 of some metal designed to resist corrosion at high temperatures such as a steel alloy of high nickel, copper, and chromium content. This insert of corrosion resisting metal preferably extends only throughout the upper critical area of the cylinder liner and in order that the piston, as it reciprocates in the cylinder, will not catch or wear on the lower edge of the insert, it is preferable that the lower edge be formed at a sloping angle with relation to a plane normal to the axis of the cylinder as indicated by a dotted line at 28.

By this method of operating an internal combustion engine with the upper portion only of its cylinder liner maintained at a temperature above dew point, and by the means herein disclosed for effecting such operation, it is possible substantially entirely to prevent corrosion and excessive wear of this portion of the cylinder liner even when fuels potentially high in their acid forming characteristics are employed.

The invention described herein has been disclosed in connection with the cylinder of an engine in which all of the cylinders are vertically disposed and the term "upper," therefore, has been employed in reference to that end of the cylinder in which the piston head travels or that end in which fuel is injected and combustion takes place. It is to be understood, therefore, that the term "upper" as used throughout the specification and claims is intended to designate that same end of the cylinder notwithstanding that in some engines some or all of the cylinders may assume positions inverted or partially inverted as compared to the cylinder in the present disclosure.

We claim:

1. In an internal combustion engine including a cylinder liner, a reciprocable piston therein, and means for cooling the cylinder liner, means for reducing the formation and deposit of corrosive substances in the area of travel of the upper portion of the piston comprising a heat transfer inhibiting shroud surrounding the cylinder liner and secured in fluid tight relationship to the upper end of the liner.

2. In an internal combustion engine including a cylinder liner, a reciprocable piston therein and means for maintaining a coolant adjacent the outside of the liner, means for reducing corrosion in the upper area of the liner comprising a skirt secured to the liner adjacent its upper edge and surrounding the exterior of the liner to provide a space for coolant sufficiently small to prevent free circulation thereof whereby that area of the liner will be maintained at an elevated temperature.

3. In an internal combustion engine including a cylinder liner, a reciprocable piston therein and means for maintaining a coolant adjacent the outside of the liner, means for reducing corrosion in the upper area of the liner comprising a dead air space encircling the liner to inhibit the transfer of heat to the coolant from said area.

4. In an internal combustion engine including a cylinder liner, a reciprocable piston therein and means for maintaining a coolant adjacent the outside of the liner, means for reducing corrosion in the upper area of the liner comprising a dead air space encircling the liner to inhibit the transfer of heat to the coolant from said area, said dead air space being formed by cutting away a portion of the liner and by fitting an inner liner therein to cover said space.

5. In an internal combustion engine including a cylinder liner, a reciprocable piston therein and means for maintaining a coolant adjacent the outside of the liner, means for reducing corrosion in the upper area of the liner comprising a skirt-like shroud secured relative to the upper outer portion of the cylinder liner and extending downwardly in spaced encircling relation thereto to provide an annular space for the reception of coolant protected from circulation and thereby to maintain the upper area of the liner at a relatively high temperature during engine operation.

6. In an internal combustion engine including a cylinder liner, a reciprocable piston therein and means for maintaining a coolant adjacent the outside of the liner, means for reducing corrosion in the upper area of the liner comprising a skirt-like shroud secured relative to the upper outer portion of the cylinder liner and extending downwardly in spaced encircling relation thereto to provide an annular space for the reception of coolant protected from circulation and thereby to maintain the upper area of the liner at a relatively high temperature during engine operation and a lining of corrosion resistant material in the upper portion of the cylinder liner.

7. In an internal combustion engine including a cylinder liner, a reciprocable piston therein and means for maintaining a coolant adjacent the outside of the liner, means for reducing corrosion in the upper area of the liner comprising a skirt-like shroud secured relative to the upper outer portion of the cylinder liner and extending downwardly in spaced encircling relation thereto to provide an annular space for the reception of coolant protected from circulation and thereby to maintain the upper area of the liner at a relatively high temperature during engine operation and a lining of corrosion resistant material in the upper portion of the cylinder liner, said lining having its surface flush with the surface of the cylinder liner and having a lower edge disposed at an angle to a plane normal to the axis of the cylinder.

8. In an internal combustion engine including a cylinder liner, a reciprocable piston therein and means for maintaining a coolant adjacent the outside of the liner, means for reducing corrosion in the upper area of the liner comprising a skirt-like shroud secured relative to the upper outer portion of the cylinder liner and extending downwardly in spaced encircling relation thereto to provide an annular space for the reception of coolant protected from circulation and thereby to maintain the upper area of the liner at a relatively high temperature during engine operation, while the lower area of the liner remains at normal operating temperature.

9. In combination with the cylinder of an internal combustion engine and means to direct a coolant against the exterior thereof, means surrounding the cylinder throughout a limited portion of its length to inhibit heat transfer to said coolant.

10. In combination with the cylinder of an internal combustion engine and means to direct a coolant against the exterior thereof, means surrounding the cylinder adjacent its head end only to inhibit heat transfer to the coolant and effect high temperature at said end while the opposite end of the cylinder is maintained at a lower temperature.

11. In an internal combustion engine which comprises an engine block, a cylinder liner secured at one end to the block and extending inwardly thereof, means to retain a coolant against the exterior of the liner and a piston reciprocal to and from said end, means for reducing the formation and deposit of corrosive substances adjacent said end of the liner including a shroud-like member embracing and spaced from the exterior of said end of the liner and secured to the liner in fluid tight relationship at said end.

12. In an internal combustion engine which comprises an engine block, a cylinder liner secured at one end to the block and extending inwardly thereof, means to retain a coolant against the exterior of the liner and a piston reciprocal to and from said end, means for reducing the formation and deposit of corrosive substances adjacent said end of the liner including a shroud-like member embracing and spaced from the exterior of said end of the liner and supported by engagement between the cylinder block and the liner.

CARL G. A. ROSEN.
CARL R. MAXWELL.
CARL H. PAUL.
RALPH J. FURSTOSS.

REFERENCES CITED

The following references are of record in the file of this patent:

UNITED STATES PATENTS

| Number | Name | Date |
|---|---|---|
| 981,238 | Barlow | Jan. 10, 1911 |
| 1,063,538 | Harper | June 3, 1913 |
| 1,107,850 | Schwarz | Aug. 18, 1914 |
| 1,285,430 | Sheppy | Nov. 19, 1918 |
| 1,384,031 | Ingram | July 5, 1921 |
| 1,860,769 | Buchi | May 31, 1932 |
| 2,143,586 | Walti | Jan. 10, 1939 |
| 2,405,152 | Kilchenmann | Aug. 6, 1946 |

FOREIGN PATENTS

| Number | Country | Date |
|---|---|---|
| 543,617 | Germany | Feb. 8, 1932 |
| 546,955 | France | Feb. 8, 1922 |
| 412,432 | Great Britain | June 28, 1934 |